(12) United States Patent
Kimura et al.

(10) Patent No.: US 9,472,226 B2
(45) Date of Patent: Oct. 18, 2016

(54) PRECISE ALIGNMENT METHOD AND PRECISE ALIGNMENT APPARATUS FOR OPTICAL COMPONENT

(71) Applicant: HITACHI INFORMATION & TELECOMMUNICATION ENGINEERING, LTD., Yokohama-shi, Kanagawa-ken (JP)

(72) Inventors: Katsumi Kimura, Kanagawa-ken (JP); Takumi Nakada, Kanagawa-ken (JP); Hiroaki Nishihara, Kanagawa-ken (JP)

(73) Assignee: HITACHI INFORMATION & TELECOMMUNICATION ENGINEERING, Yokohama-Shi (JP)

( * ) Notice: Subject to any disclaimer, the term of this patent is extended or adjusted under 35 U.S.C. 154(b) by 280 days.

(21) Appl. No.: 14/465,152

(22) Filed: Aug. 21, 2014

(65) Prior Publication Data

US 2015/0162026 A1 Jun. 11, 2015

(30) Foreign Application Priority Data

Dec. 6, 2013 (JP) ................................. 2013-252634

(51) Int. Cl.
*G11B 5/127* (2006.01)
*G11B 5/60* (2006.01)
*G11B 5/00* (2006.01)
*G11B 5/31* (2006.01)

(52) U.S. Cl.
CPC ............. *G11B 5/6088* (2013.01); *G11B 5/314* (2013.01); *G11B 2005/0021* (2013.01)

(58) Field of Classification Search
None
See application file for complete search history.

(56) References Cited

FOREIGN PATENT DOCUMENTS

JP 2013-217999 A 10/2013

*Primary Examiner* — Sath V Perungavoor
*Assistant Examiner* — Janese Duley
(74) *Attorney, Agent, or Firm* — R. Neil Sudol; Henry D. Coleman

(57) ABSTRACT

Provided is a precise alignment method for an optical component that positions a slider to X-axis and Y-axis coordinates of maximal intensity in a manner such that frame images of a laser beam passing through an optical waveguide are captured while relatively moving the slider and a semiconductor laser device at a uniform speed in the X and Y directions, the X-axis coordinate of the maximal intensity is calculated by performing a fitting calculation only in the X direction, frame images of a laser beam passing through the optical waveguide are captured by relatively moving the slider and the semiconductor laser device at a uniform speed only in the Y direction while the X-axis coordinate is fixed, and the Y-axis coordinate of the target maximal intensity is calculated by performing a fitting calculation only in the Y direction.

4 Claims, 4 Drawing Sheets

PRECISE ALIGNMENT METHOD AND PRECISE ALIGNMENT APPARATUS FOR OPTICAL COMPONENT

BACKGROUND OF THE INVENTION

1. Field of the Invention

The present invention relates to a precise alignment method and a precise alignment apparatus for an optical component capable of shortening an alignment time in which an optical axis of a semiconductor laser device is highly precisely positioned to an optical waveguide provided in a component, and particularly, to a precise alignment method and a precise alignment apparatus for an optical component capable of shortening an alignment time in which an optical axis of a semiconductor laser device of a magnetic head manufacturing apparatus, attaching the semiconductor laser device to a slider of a magnetic head, is positioned to an optical waveguide provided in the slider.

2. Description of the Related Art

Generally, in a magnetic disk device, there has been a desire for high recording density with an increase in storage capacity. In recent years, as one of techniques of drastically improving the recording density, there has been proposed a heat-assisted magnetic recording technique in which a semiconductor laser beam is irradiated to a microscopic region of about several tens of nanometers by several tens of nanometers on a magnetic disk and a heat of 200° C. or higher and a magnetic field are applied thereto. A magnetic disk device that adopts the heat-assisted magnetic recording technique has a configuration in which an optical waveguide is opened to a desired position of a slider equipped with a magnetic head element so as to cause a laser beam to pass there through, a semiconductor laser device is highly precisely positioned to the optical waveguide, and the semiconductor laser device is fixed to the optical waveguide by a UV (UV light) curable resin or the like.

In the magnetic disk device that adopts the heat-assisted magnetic recording technique, there is a need to highly precisely position the semiconductor laser device to the optical waveguide opened to a desired position of the slider. However, since the slider is a microscopic component formed in, for example, a size in which a width is 0.7 mm, a depth is 0.85 mm, and a height is 0.23 mm, the semiconductor laser device is formed in a size in which a width is 0.2 mm, a depth is 0.1 mm, and a height is 0.5 mm and has a light emission point with a diameter of 1 and the optical waveguide opened to the slider has a diameter of 1 μm, the highly precise positioning operation may not be easily performed.

Regarding the related art of highly precisely positioning a semiconductor laser device to an optical waveguide opened to a desired position of a slider, a beam passing through the optical waveguide of the slider is captured by a near field pattern (NFP) camera while the slider moves in the X and Y directions with respect to the semiconductor laser device mounted on a sub-mount, X-axis and Y-axis coordinates of a slider position in which the intensity of the captured camera image becomes maximal are detected by an image process, and the semiconductor laser device is fixed to the slider position having a maximal intensity. Specifically, as illustrated in FIG. 4, the related art is used to highly precisely position an optical axis of a semiconductor laser device 01 supported by a sub-mount 40 and emitting a laser beam 90 to an optical waveguide 30 opened to a slider 26 for a magnetic disk device. Here, a NFP camera (not illustrated) captures the image of the slider 26 from the bottom surface thereof while the slider 26 moves in the X and Y directions in the state where the semiconductor laser device 01 emitting the laser beam 90 is fixed, the slider 26 is positioned based on the X-axis coordinate and the Y-axis coordinate of the slider 26 located at a position where the intensity of the captured image becomes maximal, the semiconductor laser device 01 moves downward to the optical waveguide 30 of the slider 26, and a UV curable resin between the slider 26 and the sub-mount 40 is irradiated with UV light so as to be cured, thereby aligning and fixing the semiconductor laser device and the optical waveguide to each other.

In the alignment technique of the related art, there is a limitation in the frame rate (the number of frames captured for one second) of the NFP camera for capturing an image, and the moving speed at which the slider moves in the X and Y directions with respect to the semiconductor laser device may not be a high speed in order to perform a highly precise positioning operation. For this reason, the alignment operation is performed for a long time, and hence a problem arises in that the magnetic head manufacturing time redundantly increases.

Furthermore, Patent Document below may be given as a cited document of the related art of highly precisely positioning the semiconductor laser device to the optical waveguide opened to a desired position of the slider. JP 2013-217999 A discloses a precise alignment technique for an optical component that prevents an erroneous positioning operation of a slider due to stray light by performing a step of scanning a plurality of frame images including a laser beam passing through an optical waveguide of the slider while relatively moving a predetermined region of the slider and a laser device emitting a laser beam in a zigzag shape in the X and Y directions when the laser beam emitted from the laser device is aligned to the slider having the optical waveguide opened thereto, a step of extracting a frame image f0 of maximal illuminance including an optical image subjected to a circularity filter from the plurality of captured frame images, and a step of extracting X-axis and Y-axis coordinates of an optical image having a maximal intensity and subjected to a circularity degree checking process for XY peripheral frame images separated by ± three frames in the X and Y directions with respect to the X-axis and Y-axis coordinates of the frame image f0.

SUMMARY OF THE INVENTION

The technique disclosed in Patent Document above may prevent the erroneous positioning operation of the slider due to stray light. However, since the plurality of frame images including the laser beam passing through the optical waveguide of the slider is scanned while the predetermined region of the slider and the laser device are relatively moved in a zigzag shape in the X and Y directions, the intensity value shifted by ±1 μm from the peak position of the intensity value becomes a half or less. Based on this fact, a condition is established in which a scan of an X-axis resolution of 0.33 μm/a Y-axis resolution of 1.221 μm is performed, and hence the alignment time of about four seconds is needed in order to specify the X and Y directions at the same time.

However, there has been a high demand for a decrease in cost in the recent magnetic disk device. For this reason, there is a need to shorten the alignment time for a decrease in manufacturing cost even in the manufacturing of the magnetic head. Regarding the demand for shortening the alignment time, there is a need to consider that the massive manufacturing capacity needs to be over 600 UPH (the number of times of bonding for one hour) and the alignment time for highly precisely positioning the semiconductor laser device to the optical waveguide of the slider needs to be also two seconds or so. Due to this circumstance, the technique disclosed in JP 2013-217999 A has a problem in that the magnetic head may not be manufactured at a high speed.

The invention is made to solve the above-described problems of the related art, and an object thereof is to provide a precise alignment method and a precise alignment apparatus for an optical component capable of shortening an alignment time in which a semiconductor laser device is highly precisely positioned to an optical waveguide of a slider.

In order to achieve the above-described object, according to a first characteristic of the invention of claim 1, there is provided a precise alignment method for an optical component that causes a precise alignment apparatus to capture a plurality of frame images at a predetermined frame rate from a bottom surface of a slider while moving a semiconductor laser device and the slider in the X and Y directions and positions the semiconductor laser device and an optical waveguide based on the captured frame images, the precise alignment apparatus including an X-axis stage which supports the slider having the optical waveguide opened in a direction toward a bottom surface thereof and moves only in the X direction, a Y-axis stage which supports the slider and moves only in the Y direction, a laser fixture which grips the semiconductor laser device by separating the semiconductor laser device in a direction toward the bottom surface of the slider supported by the X-axis stage and the Y-axis stage, an observation camera which is located in a direction toward a top surface of the slider and captures a plurality of frame images at a predetermined frame rate, and control means which controls the operation of moving the slider in the X and Y directions by the X-axis stage and the Y-axis stage and the capturing operation by the observation camera, the precise alignment method for the optical component causing the control means to perform: a first step of capturing a plurality of frame images including a laser beam passing through the optical waveguide of the slider while relatively moving a predetermined region of the slider and the semiconductor laser device emitting the laser beam at a uniform speed in the X and Y directions; a second step of calculating an X-axis coordinate of maximal intensity by performing a fitting calculation on a predetermined number of frames before and after the capturing operation based on the frame of the maximal intensity only in the X direction among the plurality of frame images captured by the first step; a third step of capturing a plurality of frame images including a laser beam passing through the optical waveguide of the slider while relatively moving a predetermined region of the slider and the semiconductor laser device emitting the laser beam at a uniform speed only in the Y direction in the state where the X-axis coordinate of the maximal intensity calculated by the second step is fixed; a fourth step of calculating a Y-axis coordinate of target maximal intensity by performing a fitting calculation on a predetermined number of frames before and after the capturing operation based on the frame of the maximal intensity only in the Y direction among the plurality of frame images captured by the third step; and a fifth step of positioning the slider to the X-axis coordinate of the maximal intensity calculated by the second step and the Y-axis coordinate of the maximal intensity calculated by the fourth step. Then, according to a second characteristic of the invention of claim 2, there is provided the precise alignment method for the optical component according the first characteristic, wherein the predetermined number of frames before and after the capturing operation in the second and fourth steps is three frames.

According to a third characteristic of the invention of claim 3, there is provided a precise alignment apparatus for an optical component including: an X-axis stage which supports a slider having an optical waveguide opened in a direction toward a bottom surface thereof and moves only in the X direction; a Y-axis stage which supports the slider and moves only in the Y direction; a laser fixture which grips a semiconductor laser device by separating the semiconductor laser device in a direction toward the bottom surface of the slider supported by the X-axis stage and the Y-axis stage; an observation camera which is located in a direction toward a top surface of the slider and captures a plurality of frame images at a predetermined frame rate; and control means which controls the operation of moving the slider in the X and Y directions by the X-axis stage and the Y-axis stage and the capturing operation by the observation camera, the precise alignment apparatus for the optical component capturing a plurality of frame images at a predetermined frame rate in a direction from the bottom surface of the slider while moving the semiconductor laser device and the slider in the X and Y directions and positioning the semiconductor laser device and the optical waveguide based on the captured frame images, wherein the control means performs: a first step of capturing a plurality of frame images including a laser beam passing through the optical waveguide of the slider while relatively moving a predetermined region of the slider and the semiconductor laser device emitting the laser beam at a uniform speed in the X and Y directions; a second step of calculating an X-axis coordinate of maximal intensity by performing a fitting calculation on a predetermined number of frames before and after the capturing operation based on the frame of the maximal intensity only in the X direction among the plurality of frame images captured by the first step; a third step of capturing a plurality of frame images including a laser beam passing through the optical waveguide of the slider while relatively moving a predetermined region of the slider and the semiconductor laser device emitting the laser beam at a uniform speed only in the Y direction in the state where the X-axis coordinate of the maximal intensity calculated by the second step is fixed; a fourth step of calculating a Y-axis coordinate of target maximal intensity by performing a fitting calculation on a predetermined number of frames before and after the capturing operation based on the frame of the maximal intensity only in the Y direction among the plurality of frame images captured by the third step; and a fifth step of positioning the slider to the X-axis coordinate of the maximal intensity calculated by the second step and the Y-axis coordinate of the maximal intensity calculated by the fourth step. Then, according to a fourth characteristic of the invention of claim 4, there is provided the precise alignment apparatus for the optical component according to the third characteristic, wherein the predetermined number of frames before and after the capturing operation in the second and fourth steps is three frames.

The precise alignment method and the precise alignment apparatus for the optical component according to the invention may shorten the alignment time in which the semiconductor laser device is aligned to the optical waveguide of the slider by positioning the slider to the X-axis coordinate of the maximal intensity and the Y-axis coordinate of the maximal intensity in a manner such that a plurality of frame images including the laser beam passing through the optical waveguide of the slider is captured while a predetermined region of the slider and the semiconductor laser device relatively move at a uniform speed in the X and Y directions when the laser beam emitted from the semiconductor laser device is aligned to the slider having the optical waveguide opened thereto, the X-axis coordinate of the maximal intensity is calculated by performing a fitting calculation on a predetermined number of frames before and after the capturing operation based on the frame of the maximal intensity only in the X direction among the plurality of captured frame images, a plurality of frame images including the laser beam passing through the optical waveguide of the slider is captured while a predetermined region of the slider and the semiconductor laser device relatively move at a uniform speed only in the Y direction in the state where the X-axis coordinate of the maximal intensity is fixed, and the Y-axis coordinate of the target maximal intensity is calculated by performing a fitting calculation on a predetermined number of frames before and after the capturing operation based on the frame of the maximal intensity only in the Y direction among the plurality of captured frame images.

DETAILED DESCRIPTION OF THE PREFERRED EMBODIMENTS

Hereinafter, an embodiment of a precise alignment method and a precise alignment apparatus for an optical component according to the invention will be described in detail with reference to the drawings.

Description of Configuration

Figure 1:
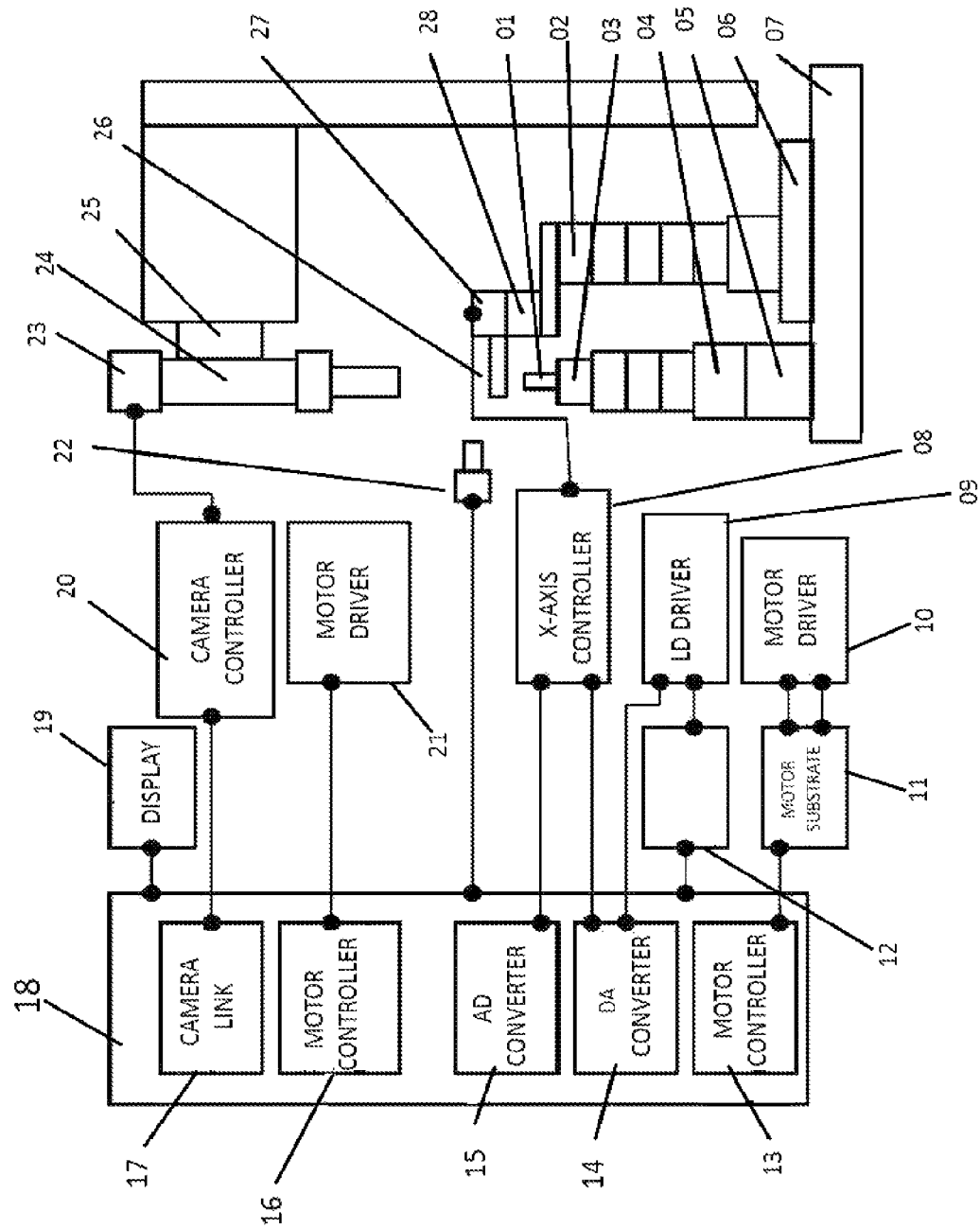
FIG. 1 is a diagram illustrating the configuration of a precise alignment apparatus for an optical component according to an embodiment of the invention.
Figure 4:
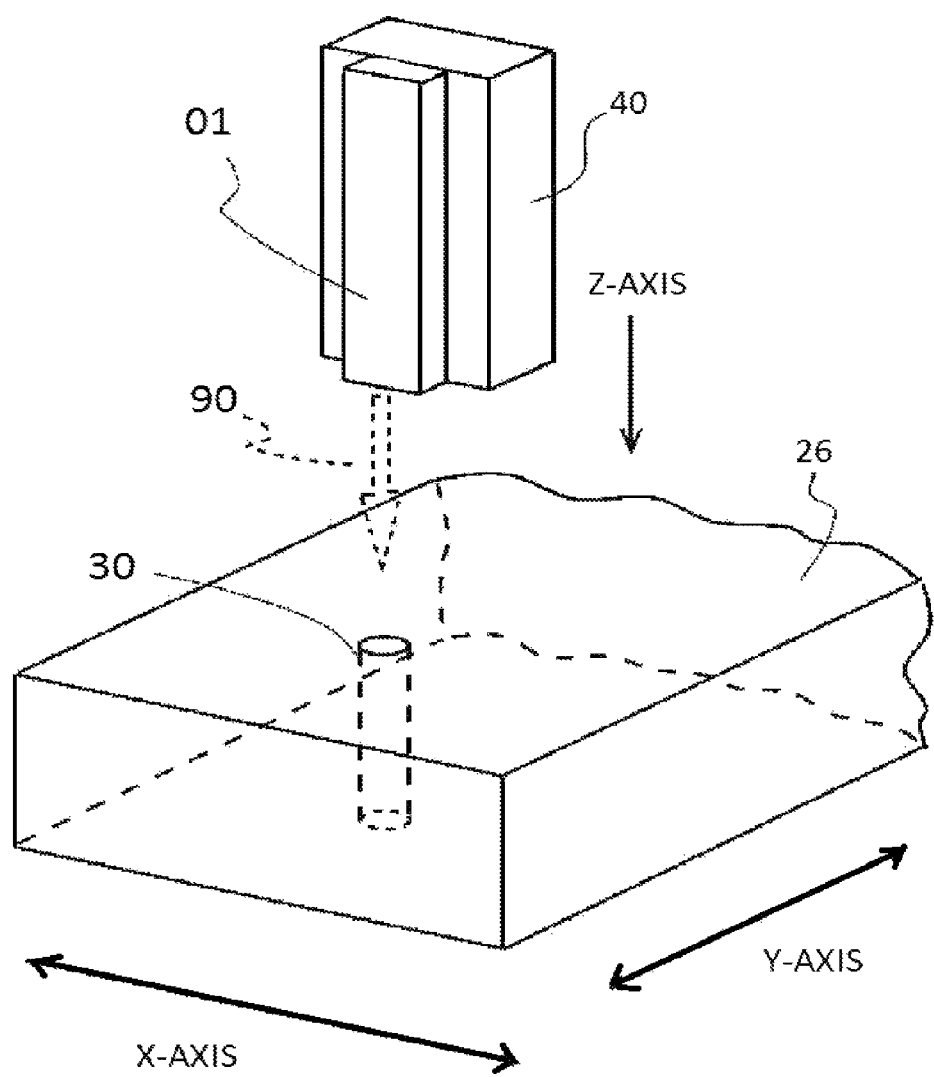
FIG. 4 is a diagram illustrating a slider and a semiconductor laser device as targets of the invention.

As illustrated in FIG. 1, the precise alignment apparatus according to the embodiment includes: a mechanism unit which is depicted at the right side in the drawing, moves relatively in the X, Y, and Z directions while being equipped with a semiconductor laser device 01 and a slider 26, and causes a near field pattern (NFP) camera 23 to capture a laser beam emitted from the semiconductor laser device 01 and passing through an optical waveguide 30 (see FIG. 4) of the slider 26; a control computer 18 which is depicted at the left side in the drawing and controls the moving operation and the capturing operation of the mechanism unit in the X, Y, and Z directions; and a driving circuit unit which drives the components of the mechanism unit by a control signal transmitted from the control computer 18.

The mechanism unit includes: a Y-axis stage 05 which is mounted on an anti-vibration table 07 and moves the slider 26 only in the Y direction; an X-axis stage 04 which is supported by the Y-axis stage 05 and moves the slider 26 only in the X direction; a laser fixture 03 which is supported by the X-axis stage 04 and the Y-axis stage 05 and is equipped with the semiconductor laser device 01; a Z-axis stage 02 which is mounted on the anti-vibration table 07 and moves only in the Z direction; an X-axis piezo-stage 27 and a Y-axis piezo-stage 28 which are equipped with the slider 26 and are mounted on the Z-axis stage 02; a Z-axis stage 25 which is mounted on the anti-vibration table 07 and moves only in the Z direction; a NFP camera 23 and a NFP optical system 24 which are supported by the Z-axis stage 25; and a charge coupled device (CCD) camera 22 which captures the lateral image of the slider 26.

The driving circuit unit includes: a camera controller 20 which controls the NFP camera 23 and the NFP optical system 24; a motor driver 21 which drives the X-axis stage, the Y-axis stage, and the Z-axis stage; a fine XY-axis controller 08 which drives the X-axis piezo-stage 27 and the Y-axis piezo-stage 28; and a function generator 12 and an LD driver 09 which control the light emission state of the semiconductor laser device 01. Furthermore, each of the X-axis piezo-stage 27 and the Y-axis piezo-stage 28 is a stage which is operated by using a piezo effect that generates an action force caused by a deformation proportional to a voltage when a voltage is applied to a crystal of a piezo-electric material.

The control computer 18 includes a display 19, a general central processing unit (CPU), storage means such as a memory and a magnetic disk device, an input/output device such as a keyboard, various interface devices, a basic operating system (OS), and software for controlling the alignment operation according to the embodiment. In the embodiment, the control computer 18 is configured to realize, by the software, the functions of a camera link 17 which is linked to the NFP camera 23 and the CCD camera 22, a motor controller 16 which controls the motor driver 21 for driving the X-axis piezo-stage 27 and the Y-axis piezo-stage 28, and an AD converter 15 and a DA converter 14 which are used for the conversion between analog data and digital data.

Description of Operation

Figure 2:
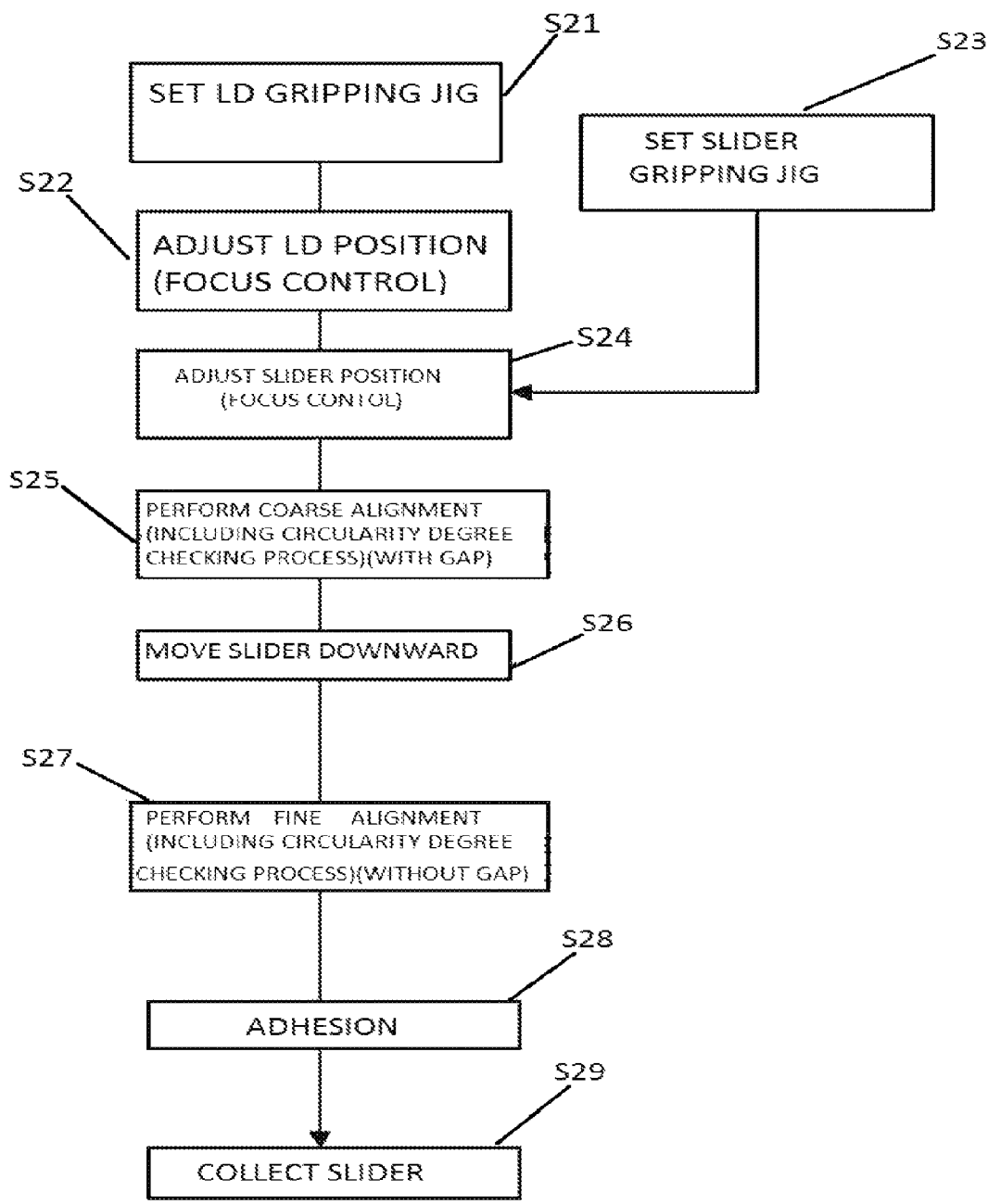
FIG. 2 is a flowchart illustrating the entire outline of an alignment operation of the precise alignment apparatus according to the embodiment.

As illustrated in FIGS. 1 and 2, both the semiconductor laser device 01 and the optical waveguide 30 of the slider 26 are fixed while the semiconductor laser device 01 is highly precisely aligned to the optical waveguide 30 by performing the entire operation of the precise alignment apparatus with such a configuration including: step S21 of setting the semiconductor laser device 01 on the laser fixture 03; step S23 of setting the slider 26 on the X-axis piezo-stage 27 and the Y-axis piezo-stage 28; step S24 of adjusting a focus position by a focus control conducted by the light emission of the semiconductor laser device 01; step S25 of receiving a laser beam emitted from the semiconductor laser device 01 and passing through the optical waveguide 30 by the NFP camera 23 while moving the X-axis stage 04 and the Y-axis stage 05 at a first predetermined speed with a gap between the semiconductor laser device 01 and the top surface of the slider 26 and of coarsely aligning the slider 26 to the X-axis stage 04 and the Y-axis stage 05 at the X-axis and Y-axis coordinates of a frame having a maximal intensity and satisfying a circularity degree checking process of checking whether an optical image obtained by the received laser beam is circular; step S26 of moving the slider 26 downward to approach the semiconductor laser device 01 so that the gap there between becomes minimal; step S27 of receiving a laser beam emitted from the semiconductor laser device 01 and passing through the optical waveguide 30 by the NFP camera 23 while moving the X-axis piezo-stage 27 and the Y-axis piezo-stage 28 at a second predetermined speed and finely aligning the slider 26 by the X-axis piezo-stage 27 and the Y-axis piezo-stage 28 based on the X-axis and Y-axis coordinates selected by step S26 which will be described later; step S28 of causing the laser device 01 and the slider 26 to adhere to each other by UV cure bonding cure bonding through the irradiation of the UV light; and step S29 of collecting the slider 26 having the semiconductor laser device 01 fixed thereto. In the embodiment, in the case where the alignment positioning operation is performed by step S27, the positioning operation may be performed at a high speed with high precision by causing the X-axis piezo-stage 27 and the Y-axis piezo-stage 28 to scan at a predetermined speed, and the detailed alignment operation performed at a high speed with high precision will be described with reference to FIG. 3.

Furthermore, in the embodiment, an example has been described in which the laser device 01 and the slider 26 adhere to each other by UV cure bonding in step S28, but the cure bonding method according to the invention is not limited to the UV cure bonding. For example, a solder cure bonding method may be used in which solder is applied (deposited) onto the laser device or the slider in advance and the solder is irradiated with a laser beam emitted from a separate external light source so that the solder is melted and cured. Alternatively, the other cure bonding methods may be used.

Figure 3:
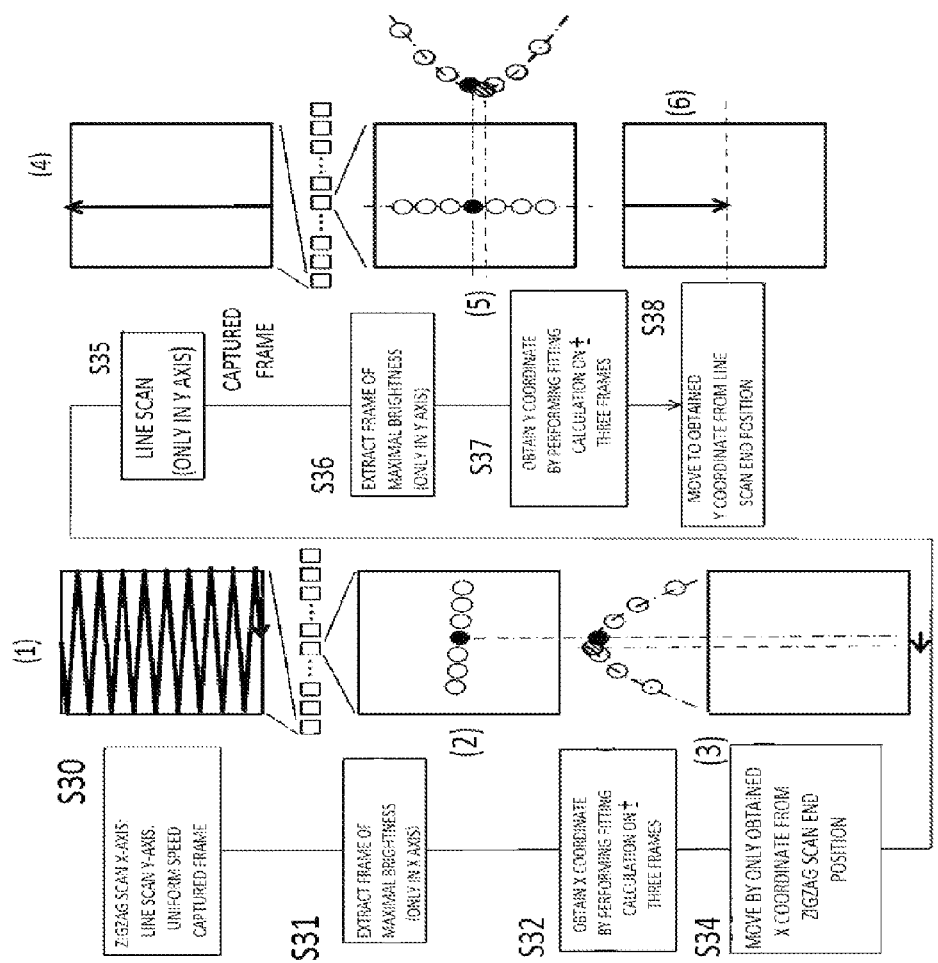
FIG. 3 is a diagram illustrating a detailed alignment operation of the precise alignment apparatus according to the embodiment.

In the alignment operation according to the embodiment, the alignment operation using a simultaneous zigzag scan in two X and Y directions in the related art is changed to the alignment operation in which a zigzag scan is performed only in the X axis and a separate line scan is performed in the Y axis so as to increase the alignment speed. That is, the alignment operation may be performed at a high speed with high precision in combination of a zigzag scan and a line scan. Specifically, as illustrated in FIG. 3 in which the steps of the alignment positioning operation are depicted at the left side and the waveguide position of the laser beam irradiated onto the slider corresponding to each step is depicted at the right side, when the slider axis direction is indicated by the X axis (the horizontal axis in the drawing) and the slider length direction is indicated by the Y axis (the vertical axis in the drawing), the alignment operation includes: step S30 of scanning the bottom surface of the slider while moving the mechanism unit in the X direction (line scan) and moving the mechanism unit at a uniform speed in the Y direction for a zigzag scan [(1) in the drawing] and acquiring a plurality of frame images captured by the NFP camera at every predetermined frame (for example, 100 pieces/second); step S31 of extracting a frame (the black circle of (2) in the drawing) of maximal intensity only in the X direction based on the image captured by the zigzag scan in step S30; step S32 of calculating the X-axis coordinate [the circle at the left side of the black circle of (3) in the drawing] of the target maximal intensity by performing a fitting calculation (a curve recurrence process of applying an approximate curve so that a distance of a data point group becomes minimal) on ± three frames based on the frame extracted by step S31; step S34 of moving the scan position ((3) in the drawing) from the end position of step S30 to the X-axis position of the maximal intensity calculated in step S32; step S35 of scanning the bottom surface of the slider while performing the line scan ((4) in the drawing) only in the Y direction from the X-axis position moved in step S34 and acquiring a plurality of frame images by the NFP camera; step S36 of extracting a frame (the black circle of (5) in the drawing) of maximal intensity only in the Y direction based on the captured image obtained by the line scan in step S35; step S37 of calculating the Y-axis coordinate [the circle below the black circle of the approximate curve (5) in the drawing] of the target maximal intensity by performing a fitting calculation on ± three frames based on the frame extracted by step S36; and step S38 of moving the position [(6) in the drawing] from the end position in step S35 to the Y-axis position of the maximal intensity obtained by step S37.

Furthermore, in the embodiment, an example has been described in which the number of the frames selected based on the frame of the maximal intensity in step S32 and step S37 is ± three frames, but the number of the frames selected based on the frame of the maximal intensity according to the invention is not limited to ± three frames. For examples, the number of the frames may be arbitrarily set by the resolution of the captured image or the needed positioning precision.

In this way, the precise alignment method and the precise alignment apparatus for the optical component according to the embodiment may shorten the alignment time in which the semiconductor laser device is highly precisely positioned to the optical waveguide of the slider by positioning the slider in the X direction of the maximal intensity and the Y direction of the maximal intensity in a manner such that a plurality of frame images including the laser beam passing through the optical waveguide of the slider is obtained while a predetermined region of the slider and the semiconductor laser device emitting the laser beam are relatively moved at a uniform speed in the X and Y directions when the laser beam emitted from the semiconductor laser device is aligned to the slider having the optical waveguide opened thereto, the X-axis coordinate of the target maximal intensity is calculated by performing a fitting calculation on ± three frames based on the frame of the maximal intensity only in the X direction among the plurality of captured frame images, a plurality of frame images including the laser beam passing through the optical waveguide of the slider is captured while a predetermined region of the slider and the semiconductor laser device emitting the laser beam are relatively moved at a uniform speed only in the Y direction in the state where the X-axis coordinate of the maximal intensity is fixed, and the Y-axis coordinate of the target maximal intensity is calculated by performing a fitting calculation on ± three frames based on the frame of the maximal intensity only in the Y direction among the plurality of captured frame images.

What is claimed is:

1. A precise alignment method for an optical component that causes a precise alignment apparatus to capture a plurality of frame images at a predetermined frame rate from a bottom surface of a slider while moving a semiconductor laser device and the slider in the X and Y directions and positions the semiconductor laser device and an optical waveguide based on the captured frame images, the precise alignment apparatus including an X-axis stage which supports the slider having the optical waveguide opened in a direction toward a bottom surface thereof and moves only in the X direction, a Y-axis stage which supports the slider and moves only in the Y direction, a laser fixture which grips the semiconductor laser device by separating the semiconductor laser device in a direction toward the bottom surface of the slider supported by the X-axis stage and the Y-axis stage, an observation camera which is located in a direction toward a top surface of the slider and captures a plurality of frame images at a predetermined frame rate, and control means which controls the operation of moving the slider in the X and Y directions by the X-axis stage and the Y-axis stage and the capturing operation by the observation camera, the precise alignment method for the optical component causing the control means to perform: a first step of capturing a plurality of frame images including a laser beam passing through the optical waveguide of the slider while relatively moving a predetermined region of the slider and the semiconductor laser device emitting the laser beam at a uniform speed in the X and Y directions; a second step of calculating an X-axis coordinate of maximal intensity by performing a fitting calculation on a predetermined number of frames before and after the capturing operation based on the frame of the maximal intensity only in the X direction among the plurality of frame images captured by the first step; a third step of capturing a plurality of frame images including a laser beam passing through the optical waveguide of the slider while relatively moving a predetermined region of the slider and the semiconductor laser device emitting the laser beam at a uniform speed only in the Y direction in the state where the X-axis coordinate of the maximal intensity calculated by the second step is fixed; a fourth step of calculating a Y-axis coordinate of target maximal intensity by performing a fitting calculation on a predetermined number of frames before and after the capturing operation based on the frame of the maximal intensity only in the Y direction among the plurality of frame images captured by the third step; and a fifth step of positioning the slider to the X-axis coordinate of the maximal intensity calculated by the second step and the Y-axis coordinate of the maximal intensity calculated by the fourth step.

2. The precise alignment method for the optical component according to claim 1,
wherein the predetermined number of frames before and after the capturing operation in the second and fourth steps is three frames.

3. A precise alignment apparatus for an optical component comprising:
an X-axis stage which supports a slider having an optical waveguide opened in a direction toward a bottom surface thereof and moves only in the X direction;
a Y-axis stage which supports the slider and moves only in the Y direction;
a laser fixture which grips a semiconductor laser device by separating the semiconductor laser device in a direction toward the bottom surface of the slider supported by the X-axis stage and the Y-axis stage;
an observation camera which is located in a direction toward a top surface of the slider and captures a plurality of frame images at a predetermined frame rate; and
control means which controls the operation of moving the slider in the X and Y directions by the X-axis stage and the Y-axis stage and the capturing operation by the observation camera, the precise alignment apparatus for the optical component capturing a plurality of frame images at a predetermined frame rate in a direction from the bottom surface of the slider while moving the semiconductor laser device and the slider in the X and Y directions and positioning the semiconductor laser device and the optical waveguide based on the captured frame images,
wherein the control means performs: a first step of capturing a plurality of frame images including a laser beam passing through the optical waveguide of the slider while relatively moving a predetermined region of the slider and the semiconductor laser device emitting the laser beam at a uniform speed in the X and Y directions; a second step of calculating an X-axis coordinate of maximal intensity by performing a fitting calculation on a predetermined number of frames before and after the capturing operation based on the frame of the maximal intensity only in the X direction among the plurality of frame images captured by the first step; a third step of capturing a plurality of frame images including a laser beam passing through the optical waveguide of the slider while relatively moving a predetermined region of the slider and the semiconductor laser device emitting the laser beam at a uniform speed only in the Y direction in the state where the X-axis coordinate of the maximal intensity calculated by the second step is fixed; a fourth step of calculating a Y-axis coordinate of target maximal intensity by performing a fitting calculation on a predetermined number of frames before and after the capturing operation based on the frame of the maximal intensity only in the Y direction among the plurality of frame images captured by the third step; and a fifth step of positioning the slider to the X-axis coordinate of the maximal intensity calculated by the second step and the Y-axis coordinate of the maximal intensity calculated by the fourth step.

4. The precise alignment apparatus for the optical component according to claim 3,
wherein the predetermined number of frames before and after the capturing operation in the second and fourth steps is three frames.

* * * * *